US008462164B2

(12) United States Patent
Stolt

(10) Patent No.: US 8,462,164 B2
(45) Date of Patent: Jun. 11, 2013

(54) APPARATUS AND METHOD FOR AN INTERFACE ARCHITECTURE FOR FLEXIBLE AND EXTENSIBLE MEDIA PROCESSING

(75) Inventor: Patrick F. Stolt, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 548 days.

(21) Appl. No.: 11/272,323

(22) Filed: Nov. 10, 2005

(65) Prior Publication Data

US 2007/0120859 A1     May 31, 2007

(51) Int. Cl.
*G06F 13/14*     (2006.01)
*G06F 15/00*     (2006.01)
*G06T 1/00*     (2006.01)

(52) U.S. Cl.
USPC .......................................... 345/519; 345/501

(58) Field of Classification Search
USPC ........................ 345/504, 506, 501, 502, 519
See application file for complete search history.

(56) References Cited

U.S. PATENT DOCUMENTS

| | | | | |
|---|---|---|---|---|
| 5,699,460 A * | 12/1997 | Kopet et al. | .................... | 382/307 |
| 5,798,770 A | 8/1998 | Baldwin | | |
| 6,208,354 B1 * | 3/2001 | Porter | ............................ | 345/634 |
| 6,262,594 B1 * | 7/2001 | Cheung et al. | .................. | 326/38 |
| 6,624,817 B1 * | 9/2003 | Langendorf | ................... | 345/520 |
| 6,630,936 B1 * | 10/2003 | Langendorf | ................... | 345/562 |
| 6,734,862 B1 * | 5/2004 | Chapple et al. | ............... | 345/520 |
| 6,760,031 B1 * | 7/2004 | Langendorf et al. | ......... | 345/502 |
| 7,483,042 B1 * | 1/2009 | Glen | ............................. | 345/629 |
| 7,598,958 B1 * | 10/2009 | Kelleher | ....................... | 345/504 |
| 2003/0001861 A1 * | 1/2003 | Watson et al. | ................ | 345/609 |
| 2004/0012606 A1 * | 1/2004 | Gim | .............................. | 345/589 |
| 2005/0195198 A1 * | 9/2005 | Anderson et al. | ............. | 345/506 |
| 2006/0197765 A1 * | 9/2006 | Dutta et al. | ................... | 345/506 |

FOREIGN PATENT DOCUMENTS

WO    WO 00/04484    1/2000

OTHER PUBLICATIONS

Intel Corporation, "Intel 82810 Graphics and Memory Controller Hub (GMCH)," Jun. 1, 1999, retrieved from: <http://download.intel.com/design/chipsets/datashts/29065602.pdf.>.
Intel Corporation, "Intel Graphics Media Accelerator 900: White Paper," Sep. 1, 2004, retrieved from: <ftp://download.intel.com/design/chipsets/applnots/30262403.pdf.>.
Office Action from Foreign Counterpart GB Patent Application No. GB0806848.8, mailed Jun. 30, 2010, 2 pages.

(Continued)

*Primary Examiner* — Jacinta M Crawford
(74) *Attorney, Agent, or Firm* — Blakely, Sokoloff, Taylor & Zafman LLP

(57) ABSTRACT

A method and apparatus for an interface architecture for flexible and extensible media processing. In one embodiment, the apparatus may include on-chip interconnection logic, such as, for example, a crossbar. The apparatus, which in one embodiment is a chipset, may include at least one on-chip, functional unit, which is coupled to the interconnection logic. The at least one functional unit to operate as media processing stage of a media processing pipeline. In one embodiment, the apparatus may further include an on-chip controller to enable at least one selected off-chip functional unit to operate as a media processing stage of the media processing pipeline. Accordingly, in one embodiment, the chipset may provide an internal media processing pipeline, which may be expanded, reduced or modified by the inclusion of at least one off-chip media processing stage. Other embodiments are described and claimed.

8 Claims, 9 Drawing Sheets

OTHER PUBLICATIONS

Office Action from Foreign Counterpart China Patent Application No. 2006-10171842.9, mailed Jan. 22, 2010, 14 pages.
Office Action from Foreign Counterpart China Patent Application No. 2006-10171842.9, mailed Feb. 27, 2009, 13 pages.
Office Action from Foreign Counterpart China Patent Application No. 2006-10171842.9, mailed Dec. 12, 2011, 14 pages.
Office Action from Foreign Counterpart China Patent Application No. 2006-10171842.9, mailed Jul. 4, 2012, 12 pages.
Office Action from Foreign Counterpart GB Patent Application No. GB0806848.8 now Granted GB2444472, mailed Feb. 16, 2012, 12 pages.

* cited by examiner

APPARATUS AND METHOD FOR AN INTERFACE ARCHITECTURE FOR FLEXIBLE AND EXTENSIBLE MEDIA PROCESSING

FIELD

One or more embodiments relate generally to the field of integrated circuit and computer system design. More particularly, one or more of the embodiments relate to a method and apparatus for an interface architecture for flexible and extensible media processing.

BACKGROUND

Typical media processing systems provide a fixed pipeline of functions that sequentially pass data through each processing stage. Examples of such media processing systems include media processing systems for audio and video for digital TV (DTV), media personal computers (PCs) and set-top boxes. In general, such media processing systems may include any system where data needs to be processed in a sequential fashion and options exist for the order of the processing the media, or different algorithms exist for processing different stages of the pipeline.

Due to the proprietary nature of many of media processing algorithms, there is a strong desire on the part of original equipment manufacturers (OEM) in this field to use their own, in-house developed, proprietary algorithms for a portion of a media processing pipeline. Such OEMs may desire the extension of, for example, video processing by use of an external custom component. Unfortunately, due to the fixed nature of such media pipelines, if an additional stage is desired in the pipeline, the system must be redesigned to add the new stage to the media processing pipeline. This severely limits the flexibility and extensibility of such media processing systems.

BRIEF DESCRIPTION OF THE DRAWINGS

The various embodiments of the present invention are illustrated by way of example, and not by way of limitation, in the figures of the accompanying drawings and in which.

DETAILED DESCRIPTION

A method and apparatus for an interface architecture for flexible and extensible media processing are described. In one embodiment, the apparatus may include on-chip interconnection logic, such as, for example, a crossbar. The apparatus, which in one embodiment is a chipset, may include at least one on-chip, functional unit, which is coupled to the interconnection logic. The at least one functional unit to operate as a media processing stage of a media processing pipeline. In one embodiment, the apparatus may further include an on-chip controller to enable at least one selected off-chip functional unit to operate as a media processing stage of the media processing pipeline. Accordingly, in one embodiment, the chipset may provide an internal media processing pipeline, which may be expanded, reduced or modified by the inclusion of at least one off-chip media processing stage.

In the following description, numerous specific details such as logic implementations, sizes and names of signals and buses, types and interrelationships of system components, and logic partitioning/integration choices are set forth in order to provide a more thorough understanding. It will be appreciated, however, by one skilled in the art that the invention may be practiced without such specific details. In other instances, control structures and gate level circuits have not been shown in detail to avoid obscuring the invention. Those of ordinary skill in the art, with the included descriptions, will be able to implement appropriate logic circuits without undue experimentation.

In the following description, certain terminology is used to describe features. For example, the term "logic" is representative of hardware and/or software configured to perform one or more functions. For instance, examples of "hardware" include, but are not limited or restricted to, an integrated circuit, a finite state machine or even combinatorial logic. The integrated circuit may take the form of a processor such as a microprocessor, application specific integrated circuit, a digital signal processor, a micro-controller, or the like.

System

Figure 1:
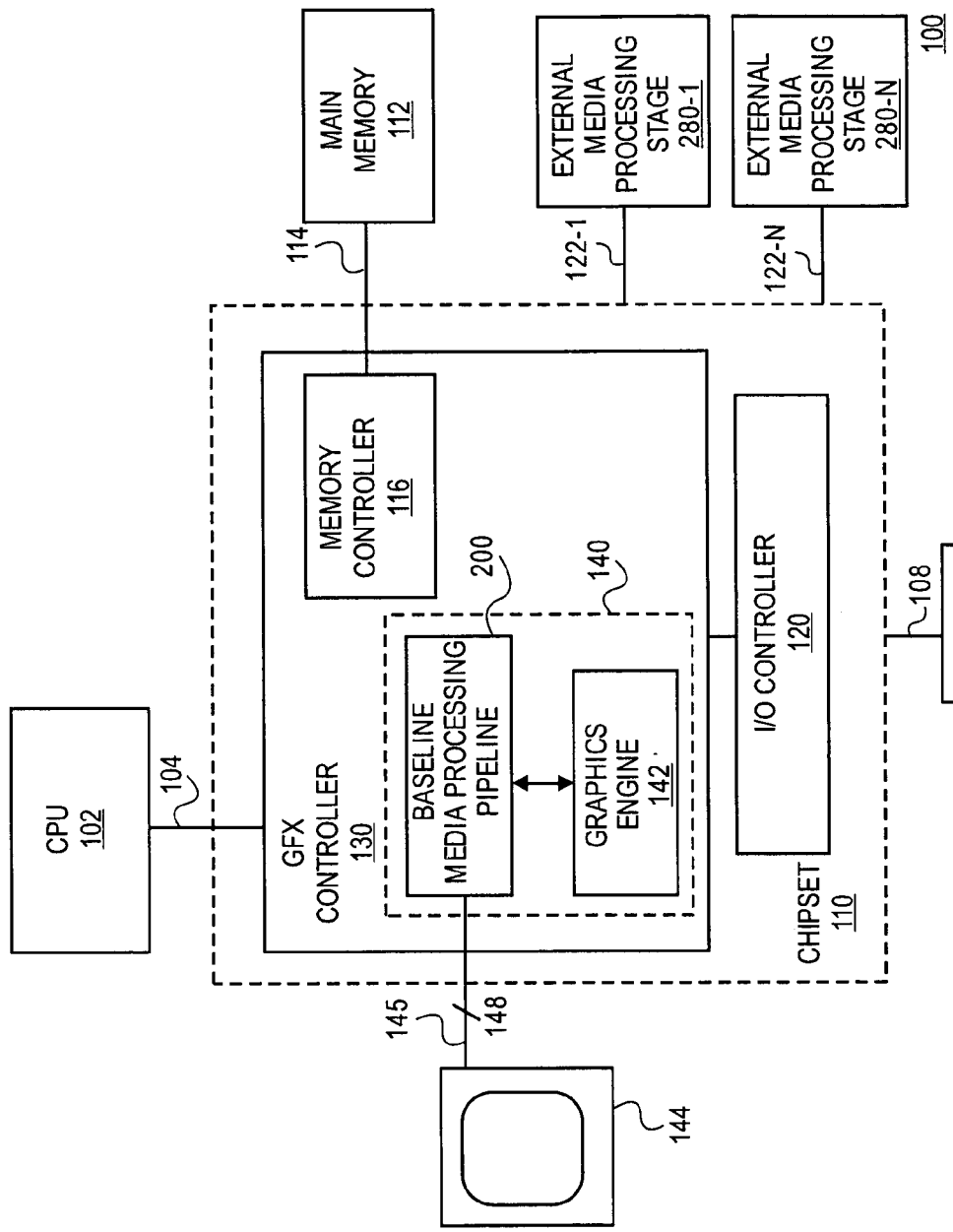
FIG. 1 is a block diagram illustrating a media processing system, including an interface architecture, for flexible and extensible media processing, in accordance with one embodiment.

FIG. 1 is a block diagram illustrating computer system 100 including an internal (on-chip) media processing pipeline 200 and external processing media stages 280 (280-1, . . . , 280-N), in accordance with one embodiment. Representatively, computer system 100 comprises a processor system bus (front side bus (FSB)) 104 for communicating information between processor (CPU) 102 and chipset 110. As described herein, the term "chipset" is used in a manner to collectively describe the various devices coupled to CPU 102 to perform desired system functionality. In one embodiment, CPU 102 may be a multicore chip multiprocessor (CMP).

Representatively, chipset 110 includes an integrated graphics (GFX) controller 130 having integrated memory controller (MC) 116. In one embodiment, GFX controller 130 operates as an integrated graphics memory controller hub (GMCH), and is coupled to display 144 via interconnect 145 to provide display output 148. In an alternative embodiment, graphics controller 130 is coupled to chipset 110 and separate from MC 116, such that chipset 110 includes a memory controller hub (MCH) separate from GFX controller 130. Representatively, MC 116 is also coupled to main memory 112 via interconnect 114. In one embodiment, main memory 114 may include, but is not limited to, random access memory (RAM), dynamic RAM (DRAM), static RAM (SRAM), synchronous DRAM (SDRAM), double data rate (DDR) SDRAM (DDR-SDRAM), Rambus DRAM (RDRAM) or any device capable of supporting high-speed buffering of data.

As further illustrated, chipset 110 includes an input/output (I/O) controller hub (ICH) 120. Representatively, ICH 120 may include one or more links or interconnects 122 (122-1, . . . , 122-N) to couple one or more external media processing stages 280 to ICH 120. In one embodiment, interconnect 122 operates according to a point-to-point link protocol including peripheral component interconnect (PCI) express (PCI-Express) protocol 1.0a, approved by the PCI special interest group (PCI-SIG) as a standard on Jul. 23, 2002, or other like point-to-point interconnect protocol. In one embodiment, basic input/output system (BIOS) 106 initializes computer system 100. Although chipset 110 is illustrated as including a separate GMCH 130 and ICH 120, in one embodiment, GMCH 130 may be integrated within CPU 102 to provide, for example, a system on chip (SOC). In an alternate embodiment, the functionality of GMCH 116 and ICH 120 are integrated within chipset 110.

In one embodiment, a modified media processing pipeline, including media processing stages from internal media processing pipeline 200 and external media processing stages 280 may be implemented within computer systems including an MCH integrated within a CPU, an MCH and ICH integrated within a chipset, as well as a system on-chip. Accordingly, it should be recognized that FIG. 1 is provided to illustrate one embodiment and should not be construed in a limiting manner. In one embodiment, GFX controller 130 includes video controller 140 for displaying data 148 on display 144. In one embodiment, display 144 may be a digital television (TV) (DTV) display.

Representatively, video controller 140 may include a graphics engine 142 and internal media processing pipeline 200 to process media data to enable display of such data. Accordingly, in the embodiments described herein, system 100 provides an architecture for distributed media processing, which allows internal functional units and external functional units that share data through a common memory array to process portions of a media processing pipeline. As described herein, "media" may include, but is not limited to, audio data, video data or other like content, which may be desired for playback by a user. As described in further detail below, in one embodiment, internal media processing pipeline 200 is comprised of a plurality of on-chip functional units. As described herein, an on-chip (internal) functional unit refers to a functional unit that provides one or more processing elements to function as an internal (on-chip) media processing stage of a media processing pipeline.

Conventionally, typical media processing systems provide a fixed pipeline of functions that sequentially pass data through each stage. If an additional stage is desired in the pipeline, the system must be redesigned to add the new stages to the pipeline. This severely limits the flexibility and extensibility of the media processing system. In one embodiment, the media processing system 100, as shown in FIG. 1, may be configured to operate in the areas of video and audio processing for DTV, media, PCs and set-top boxes.

Figure 2:
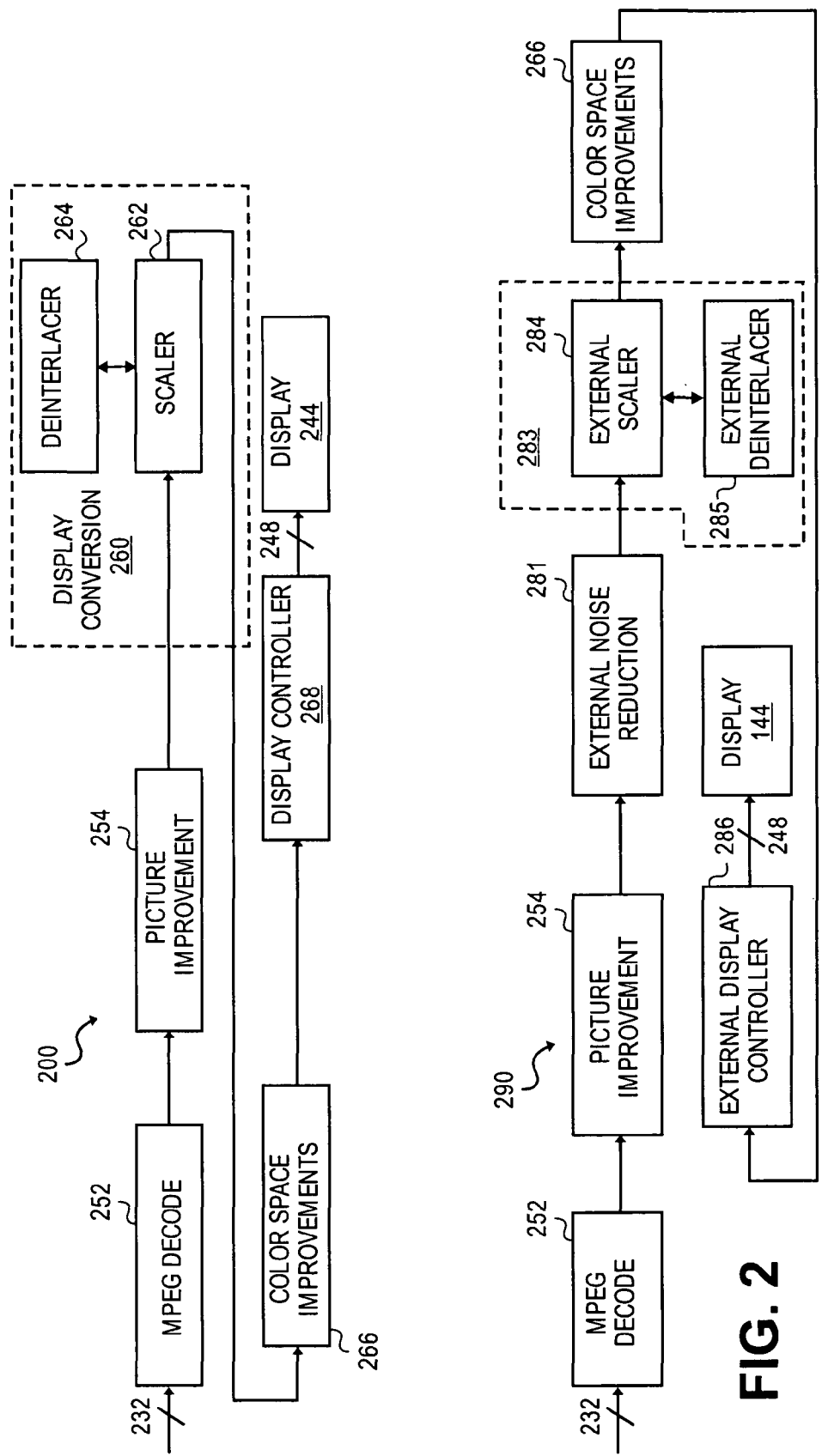
FIG. 2 is a block diagram illustrating internal and modified media processing pipelines, in accordance with one embodiment.

FIG. 2 is a block diagram further illustrating media processing pipeline 200 in combination with external media processing stages 280, in accordance with one embodiment. Representatively, FIG. 2 illustrates media processing stages (252, 254, 260, 266 and 268) of internal media processing pipeline 200, which may be used in, for example, a media processing system, such as a DTV system. Representatively, media processing pipeline 200 may include: (1) motion picture expert group (MPEG) decode stage 252; (2) picture improvement stage 254; (3) display conversion stage 260; (4) color space improvement stage 266; and (5) display controller stage 268.

As shown in FIG. 2, internal media processing pipeline 200 is typically configured on an integrated circuit, such as a chipset for use in a set-top box, a media PC, DTV system, as a static and fixed media processing pipeline. Accordingly, an original equipment manufacturer (OEM) or an original design manufacturer (ODM) that desires modification to media processing pipeline 200, as shown in FIG. 2, would be required to redesign media processing pipeline 200 to add on a desired additional stage to replace or augment an internal media processing stage.

FIG. 2 illustrates one embodiment of modified media processing pipeline 290 to include an external noise reduction stage 281 between picture improvement stage 254 and prior to display conversion stage 260. In the embodiment illustrated, the display conversion stage 260 is disabled and replaced with external display conversion stage 283, including external scalar stage 284 and external de-interlacer stage 285. Likewise, in the embodiment illustrated, external display controller 286 replaces display controller stage 268. One embodiment of a media processing system for implementing modified media processing pipeline 290 is shown in FIG. 4, in accordance with one embodiment.

Figure 3:
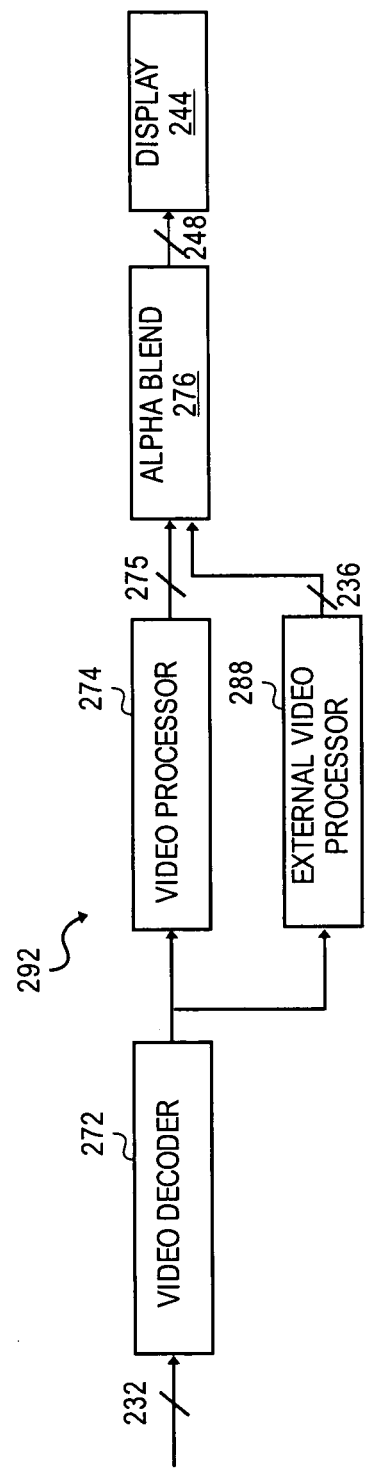
FIG. 3 is a block diagram illustrating a modified media processing pipeline, in accordance with one embodiment.

FIG. 3 illustrates one embodiment of a DTV processing pipeline 292, including a video decoder stage 272; a video processor stage 274 and an alpha blend stage 276 to drive a DTV display 244. However, in contrast to conventional fixed media processing pipelines, in one embodiment, an external video processor stage 288 may be added to the output of the video decoder stage 272 to form modified internal/external media processing pipeline 292. In the embodiment illustrated, external video processor 288 may generate alternate video output 236, which is provided to alpha blend stage 276. Accordingly, in the embodiment illustrated, modified media processing pipeline 292 includes an internal video processor 274 and an external video processor 276 to provide alternate forms of video image data to provide final display output 248.

In the embodiments described, the configuration of modified media processing pipeline 290 and 292, as shown in FIGS. 2 and 3, are provided as an examples of possible embodiments, and should not be construed in a limiting sense. Accordingly, in the embodiments described, a media processing system (e.g., system 100), and specifically the capability to incorporate external media processing stages into an on-chip (internal) media processing pipeline, can be applied to any system where data needs to be processed in a sequential fashion and options exists for the order of processing of the data or different algorithms exist for different stages of the pipeline.

Figure 4:
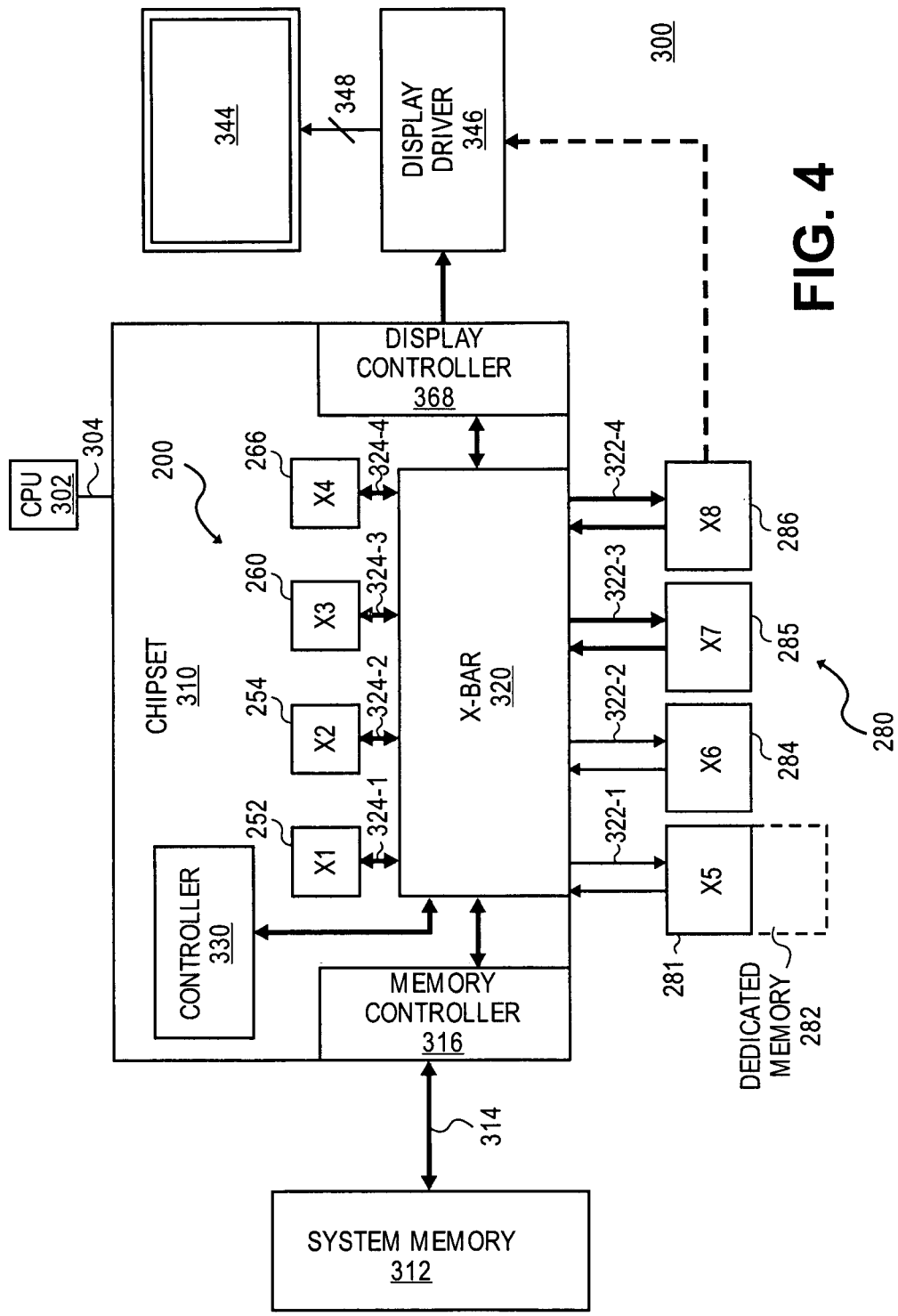
FIG. 4 is a block diagram illustrating a media processing system having an interface architecture for flexible and extensible media processing, in accordance with one embodiment.

FIG. 4 is a block diagram illustrating a media processing system 300, including an internal media processing pipeline 200, as well as external media processing stages 280, in accordance with one embodiment. In one embodiment, computer system 300 includes chipset 310, which may be coupled to a processor 302 via FSB 304. As further illustrated, chipset 310 may include a memory controller 316, which is coupled to a system memory 312 via link 314. In the embodiment described, system memory 314 and memory controller 316 may be configured as shown in FIG. 1.

Representatively, chipset 310, in one embodiment, is a graphics memory controller hub (GMCH) including integrated memory controller 316. In one embodiment, chipset 310 may be an application specific standard product (ASSP). As further illustrated, chipset 310 may include ports 322 (322-1, 322-2, 322-3, 322-4) to couple external media processing stages 280 to chipset 310. Ports 322 enable coupling of external media processing stages 280 to crossbar 320. In one embodiment, crossbar 320 may be a PCI-Express crossbar.

In one embodiment, crossbar 320 enables connection between stages (252, 259, 260 and 266) of media processing pipeline 200 via links 324 (324-1, 324-2, 324-3, 324-4) and external media processing stages 280 (282, 284, 286 and 288) to enable such media processing stages to share a memory array provided by system memory 312. As further illustrated, display controller 368 is provided for outputting the resultant media 348 to display driver 346 to drive DTV display 344.

As described herein, to "source and sink media data" refers to the capability provided by crossbar 320 or other like interconnection device to enable an external media processing stage to receive data at a predetermined position within an internal media processing pipeline as a source and to output processed media data as a sink to a next stage within the media processing pipeline following the predetermined position of the external media processing stage within the internal media processing pipeline. In one embodiment, the capability provided by crossbar 320 to source and sink media data for internal/external media processing stages enables the formation of a modified internal/external media processing pipeline.

Representatively, MPEG decode stage 254, picture improvement stage 256, display conversion stage 260 and color space improvement stage 266 are shown as blocks x1, x2, x3 and x4. Representatively, the processing of media data is handled by each stage of internal media processing pipeline 280 and the data source and sink for each stage is the shared memory 312. In one embodiment, crossbar 320 enables additional external processing stages 280 to be added to system 300 to either replace or augment the internal functions, for example, as shown by modified media processing pipeline 290, as shown in FIG. 2.

In one embodiment, noise reduction functions stage 281 may be implemented as external media processing stage (x5) 281. In one embodiment, alternate de-interlacer stage (x6) 284 could replace de-interlacer 264 of display conversion stage 260, as shown in FIG. 2, while alternate scalar (x7) 285 could be used to replace scalar 262 of display conversion stage 260. In one embodiment, alternate display controller (x8) 288 could replace display controller 268.

Accordingly, as shown in FIG. 4, the source and sink of all media data is the shared memory provided by system memory 312. As further illustrated in FIG. 4, any of the external media processing stages 280 could also include an optional dedicated memory 282 to hold intermediate data or as additional buffering. In one embodiment, external media processing stage (x5) 281 includes dedicated memory 282.

In the embodiment illustrated in FIG. 4, crossbar 320 is illustrated as providing the connection between the internal media processing stages 200 and the external media processing stages 280. Due to the wide availability, high bandwidth and low pin count crossbar 320 may be implemented using a PCI-Express crossbar. However, it should be recognized that the embodiments described herein are not limited to a crossbar, as provided by PCI-Express, such that many alternatives could be used for internal links 324 and external links 322. In one embodiment, internal links 324 are different than external links 322. Also, in one embodiment, although no connectors are shown, the links 322 for external processing stages x5-x8 (281, 284, 285 and 286) could be implemented through connectors, such that external media processing stages 280 could be provided by add-in boards.

Figure 5:
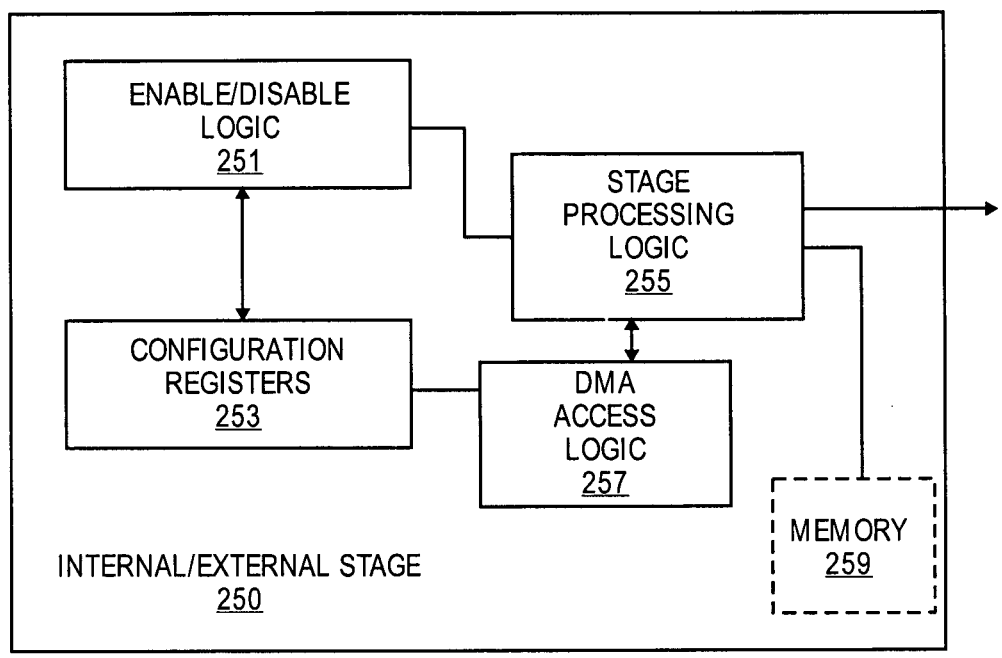
FIG. 5 is a block diagram illustrating an internal/external processing selection logic, in accordance with one embodiment.

FIG. 5 is a block diagram illustrating an internal/external media processing stage 250, in accordance with one embodiment. Representatively, stage 250 includes enable/disable logic 251 for enabling/disabling processing stage logic 255. Accordingly, in one embodiment, enable/disable logic 251 provides a mechanism to enable or disable a media processing stage. In one embodiment, the enable/disable logic 251 may completely disable stage processing logic 255 if the stage processing logic 255 provides a single function. In one embodiment, enable/disable may be provided to disable individual parts of a multifunction processing stage.

For example, as shown in FIG. 2, display conversion stage 260 provides multifunctions, including de-interlacer stage 264 and scalar stage 262. Accordingly, in one embodiment, enable/disable logic 251 could disable one or more of the multifunctions provided by a multifunction media processing stage, such as scalar stage 262 of display conversion stage 260. In one embodiment, enable/disable logic 251 may be directed to enable/disable one or more functions provided by processing stage logic 255 according to values contained in configuration registers 253. For example, an internal block, such as display conversion stage 260, may provide a scaling function; however, a different scaling function may be desired by an OEM. To enable the alternate scaling function, in one embodiment the OEM will place the alternate scaling function externally (e.g., external scaler 284) and subsequently disable the internal scaling function (e.g., scaler 262), for example, as shown in FIG. 2.

Referring again to FIG. 4, crossbar functionality 320 sets up the direction and location of data flow and in one embodiment, is configured to determine the media processing stages, which are enabled and disabled. In one embodiment, an OEM may use both an internal function and an external function, depending on several factors, such as input type, such as a resolution or simply based on a user's personal preference, or for example, a particular end user may like one version better than another version for the media. Referring again to FIG. 2, external noise reduction functions stage 281 provides an example of a processing stage where both an internal and external noise reduction stage may be desired.

Referring again to FIG. 5, in one embodiment, enable/disable logic 251 may include a microcontroller (not shown) rather than a hard coded state machine to provide enable/disable logic functionality. In one embodiment, the microcontroller may be loaded with code at run-time by a master controller (not shown) that could be internal or external to chipset 310 (FIG. 4). In one embodiment, once the code for the local controller is running, a communication link is established with the master controller such that any requested user settings are communicated to the local controller through the established communications link.

In an alternate embodiment, configuration registers 253 are software visible and may be accessed directly by a controller that could be either an internal or external master CPU/controller. In one embodiment, the registers of configuration registers 253 could be loaded directly by, for example, configuration software. In one embodiment, stage 250 includes direct memory access (DMA) logic 257. In one embodiment, DMA logic 257 determines where a next "frame" is located in memory that the processing stage is required to process. In one embodiment, a local controller, may function as DMA access logic 257. However, in the embodiments described a DMA controller is not required and any configuration mechanism to enable a stage to determine a next frame for processing may be utilized in place of DMA access logic 257. As further shown in FIG. 5, internal/external stage 250 may include optional, dedicated memory 259.

Figure 6:
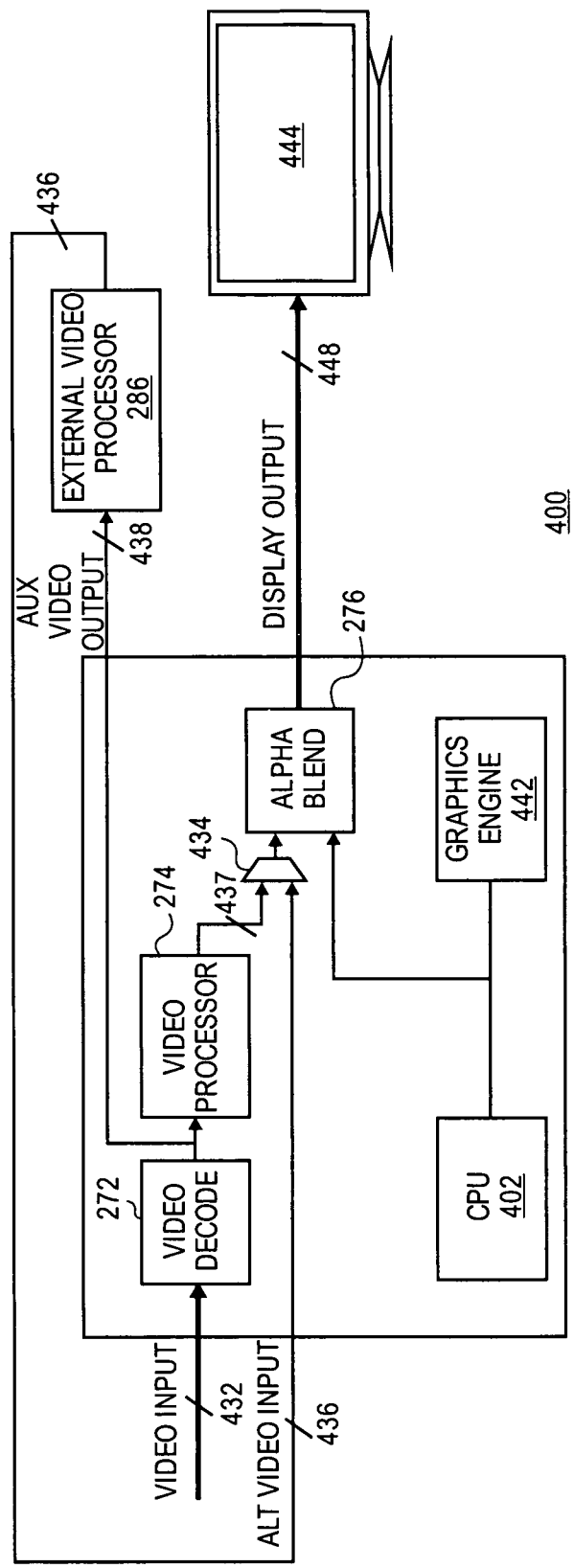
FIG. 6 is a block diagram illustrating a system on-chip, including an interface architecture for flexible and extensible media processing, in accordance with one embodiment.

FIG. 6 is a block diagram illustrating a system on-chip 400, including an external video processor 286 to augment an internal video processing pipeline, in accordance with one embodiment. In one embodiment, system on-chip (SOC) 400 provides an optimization method for video to be processed by SOC 400 or an ASSP and retain the ability to have an external video processor 286 to enable processing of video without having to process an application's graphic overlay on, for example, a video stream, as shown in FIG. 3.

Referring again to FIG. 3, due to the proprietary nature of many video processing algorithms, there is a strong desire on the part of OEMs in this field to use their own in-house-developed proprietary algorithms for a portion of the video processing. Representatively, FIG. 3 illustrates an embodiment where a multistage video processing pipeline of SOC 400 is extended to provide additional processing by the use of an external custom component 286.

Referring again to FIG. 6, SOC 400 may include an application processor (CPU) 402, a graphics engine 442 and a multi-stage video processing chain. Representatively, the multi-stage video processing chain includes video decode stage 272, video processor stage 274 and alpha blend stage 276. Representatively, SOC 400 receives video input 432. In one embodiment, the video input 432 may be one of many video standards, such as an Advanced Televisions Systems Committee (ATSC) transport stream from an ATSC tuner. Likewise, the output from alpha blend stage 276 may be used to directly derive DTV display 444.

Representatively, an alternate output 438 is provided for decompressed video data received from video decode stage 272 prior to any video processing or graphics overlays that would pollute the video stream. This auxiliary video output 438 is processed by external video processor 286 to provide alternative video input 436. Representatively, an input for processed video path 437 and alternative video input 436 is provided by, for example, selection device 474. Representatively, selection device 434 enables the bypassing of display processing, but allows secondary video stream 436 to be mixed for, for example, picture-in-picture (PIP) and graphics overlays, including, but not limited to, closed captioning, electronic program guides, menus and the like. Representatively, secondary video stream 436 is added before sending the final display output 448 to DTV display 444. Procedural methods for implementing one or more embodiments are now described.

Operation

Figure 7:
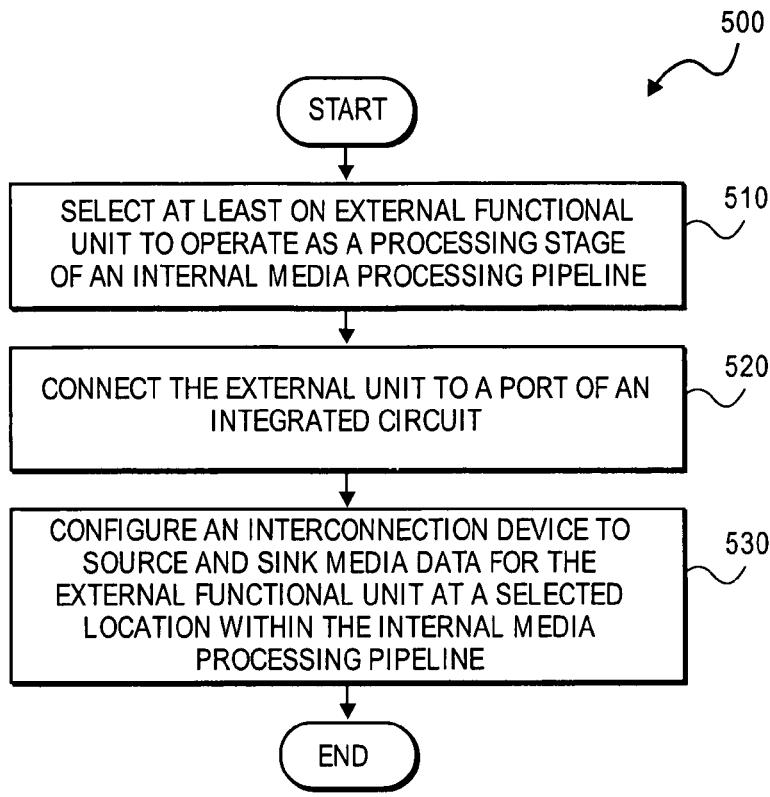
FIG. 7 is a flowchart illustrating a method for configuration of a modified internal/external media processing pipeline, in accordance with one embodiment.

Turning now to FIG. 7, the particular methods associated with various embodiments are described in terms of computer software and hardware with reference to a flowchart. The methods to be performed by a computing device (e.g., a chipset) may constitute state machines or computer programs made up of computer-executable instructions. The computer-executable instructions may be written in a computer program and programming language or embodied in firmware logic. If written in a programming language conforming to a recognized standard, such instructions can be executed in a variety of hardware platforms and for interface to a variety of operating systems.

In addition, embodiments are not described with reference to any particular programming language. It will be appreciated that a variety of programming languages may be used to implement embodiments as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 7 is a flowchart illustrating a method 500 for configuration of a modified internal/external media processing pipeline, in accordance with one embodiment. In the embodiments described, examples of the described embodiments will be made with reference to FIGS. 1-6. However, the described embodiments should not be limited to the examples provided to limit the scope provided by the appended claims.

Referring again to FIG. 7, at process block 510, an external functional unit is selected to operate as a processing stage of an internal media processing pipeline. For example, as shown in FIG. 4, an external noise reduction function, such as, for example, x5 stage 281, may be selected to provide noise reduction functions between x1 stage 252 and x2 stage 254 of internal media pipeline 200. Referring again to FIG. 7, at process block 520, the selected external unit may be connected to a port of an integrated circuit. For example, as shown in FIG. 3, x5 stage 282 may be coupled to an external port 322 for communication with crossbar 320. Although connectors are not shown for links 322 of FIG. 3, external stages 280 may be connected to add-in boards or via pin connection to a trace coupled to a port of chipset 310.

Referring again to FIG. 7, at process block 530, an interconnection device is configured to source and sink media data for the external functional unit at a selected location within the internal media processing pipeline. For example, as shown in FIG. 4, external noise reduction stage 281 is source and sinked to receive media data between MPEG decode stage 252 and picture improvement stage 254. Accordingly, in the embodiment illustrated in FIG. 4, crossbar 320 may be configured by programming a microcontroller (not shown), which may be loaded with code at boot time by a master controller that could be external or internal to, for example, the chipset 310, as shown in FIG. 4.

Figure 8:
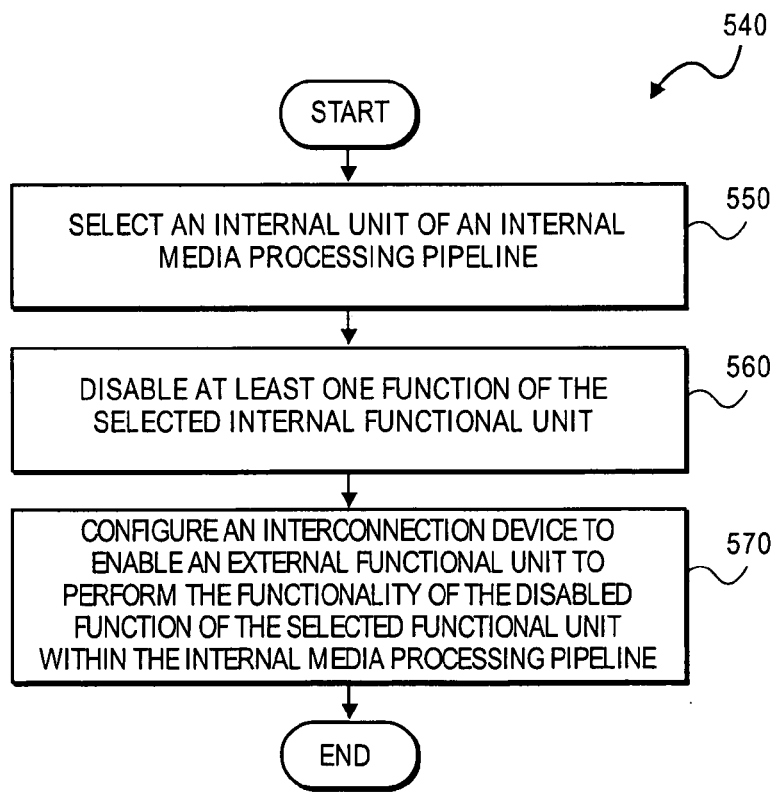
FIG. 8 is a flowchart illustrating a method for disabling functionality of at least one internal media processing stage and providing the functionality of the disabled internal media processing stage via an external functional unit, in accordance with one embodiment.

FIG. 8 is a flowchart illustrating a method 540 for replacing an internal processing stage of an internal media processing pipeline, in accordance with one embodiment. At process block 550, an internal functional unit of the media processing pipeline is selected. For example, as shown in FIG. 2, scaling stage 262 of display conversion stage 260 may be selected for replacement. Once selected, at process block 560, the selected function of the internal function unit is disabled. In one embodiment, disabling of the functional unit is performed by generation of initialization code, which may, for example, program configuration registers of an internal/external media stage, for example, as shown in FIG. 5. At process block 570, the interconnection device is configured to enable an external functional unit to perform the functionality of the disabled internal function within the internal media processing pipeline.

Figure 9:
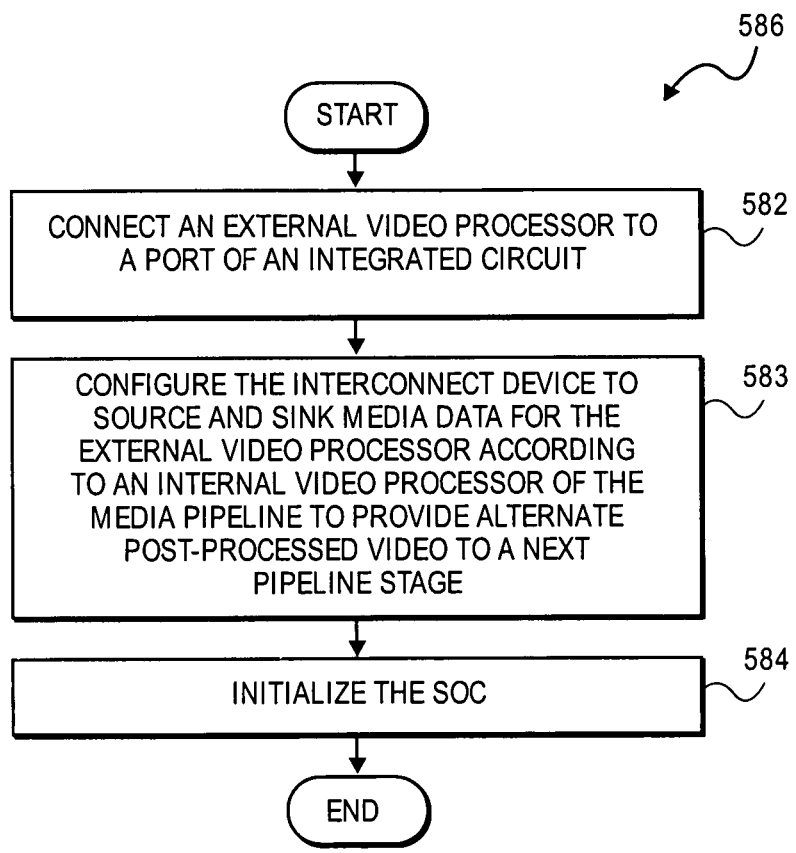
FIG. 9 is a flowchart illustrating a method for configuring a modified internal/external video processing pipeline, in accordance with one embodiment.

FIG. 9 is a flowchart illustrating a method 580 for augmenting an internal processing stage of an internal media processing pipeline, in accordance with one embodiment. At process block 582, an external video processor is connected to a port of an integrated circuit. For example, as shown in FIG. 6, external video processor 288 is sourced and sinked between a video decode stage 272 and an internal input selection unit 434. Once connected, at process block 583, an interconnection device is configured to source and sink media data for the external video processor according to an internal video processor of the media processing pipeline to provide alternate post-processed video data to a next stage. For example, as shown in FIG. 3, alpha blend stage 276 may receive processed video data 437 from internal video processor 274, as well as alternate video data 436, as processed by external video processor 288. Once configured, at process block 584, an integrated circuit (IC), such as, for example, a system on chip (SOC) is initialized.

Accordingly, in the embodiments described for computer systems, such as a set-top box, a media PC or DTV, an architecture is provided for distributed media processing, which allows internal functional unit and an external functional unit that share data through a common memory array to process portions of a media processing pipeline, for example, as shown in FIGS. 1, 3 and 6. Accordingly, in one embodiment, the ability is provided for a media processing pipeline to allow extensions and alternate processing elements to be added to any point within the media processing pipeline, for example, as shown in FIGS. 2 and 3. Accordingly, an OEM, or ODM is given the ability to generate flexible systems with differentiation. This differentiation acknowledges that for whatever group of functions that are provided as part of an internal processing pipeline, in for example, a media processing ASSP (e.g., chipset 310), there exists better algorithms from additional OEMs in the industry for performing one or more of the media processing stages. In one embodiment, such OEMs and ODMs may supplement, replace or augment the internal media process stages of a media processing pipeline, in accordance with one embodiment.

Figure 10:
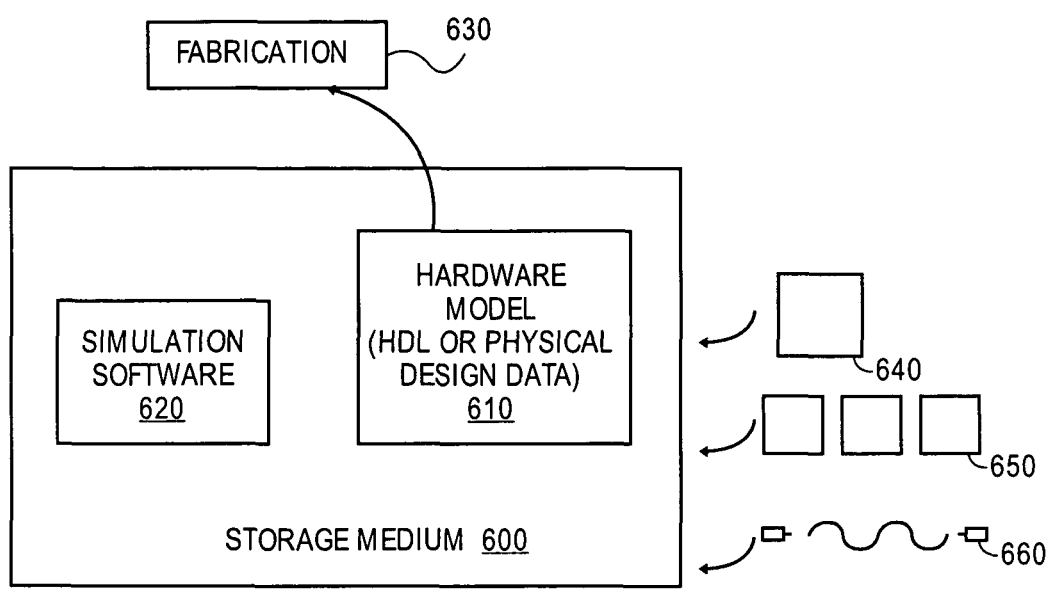
FIG. 10 is a block diagram illustrating various design representations or formats for simulation, emulation and fabrication of a design using the disclosed techniques.

FIG. 10 is a block diagram illustrating various representations or formats for simulation, emulation and fabrication of a design using the disclosed techniques. Data representing a design may represent the design in a number of manners. First, as is useful in simulations, the hardware may be represented using a hardware description language, or another functional description language, which essentially provides a computerized model of how the designed hardware is expected to perform. The hardware model 610 may be stored in a storage medium 600, such as a computer memory, so that the model may be simulated using simulation software 620 that applies a particular test suite 630 to the hardware model to determine if it indeed functions as intended. In some embodiments, the simulation software is not recorded, captured or contained in the medium.

Additionally, a circuit level model with logic and/or transistor gates may be produced at some stages of the design process. The model may be similarly simulated some times by dedicated hardware simulators that form the model using programmable logic. This type of simulation taken a degree further may be an emulation technique. In any case, reconfigurable hardware is another embodiment that may involve a machine readable medium storing a model employing the disclosed techniques.

Furthermore, most designs at some stage reach a level of data representing the physical placements of various devices in the hardware model. In the case where conventional semiconductor fabrication techniques are used, the data representing the hardware model may be data specifying the presence or absence of various features on different mask layers or masks used to produce the integrated circuit. Again, this data representing the integrated circuit embodies the techniques disclosed in that the circuitry logic and the data can be simulated or fabricated to perform these techniques.

In any representation of the design, the data may be stored in any form of a machine readable medium. An optical or electrical wave 660 modulated or otherwise generated to transport such information, a memory 650 or a magnetic or optical storage 640, such as a disk, may be the machine readable medium. Any of these mediums may carry the design information. The term "carry" (e.g., a machine readable medium carrying information) thus covers information stored on a storage device or information encoded or modulated into or onto a carrier wave. The set of bits describing the design or a particular of the design are (when embodied in a machine readable medium, such as a carrier or storage medium) an article that may be sealed in and out of itself, or used by others for further design or fabrication.

Alternate Embodiments

Elements of embodiments may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments described may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments.

In the above detailed description of various embodiments, reference is made to the accompanying drawings, which form a part hereof, and in which are shown by way of illustration, and not of limitation, the practice of specific embodiments practiced. In the drawings, like numerals describe substantially similar components throughout the several views. The embodiments illustrated are described in sufficient detail to enable those skilled in to the art to practice the teachings disclosed herein. Other embodiments may be utilized and derived therefrom, such that structural and logical substitutions and changes may be made without departing from the scope of this disclosure. The following detailed description, therefore, is not to be taken in a limiting sense, and the scope of various embodiments is defined only by the appended claims, along with the full range of equivalents to which such claims are entitled.

Having disclosed embodiments and the best mode, modifications and variations may be made to the disclosed embodiments while remaining within the scope of the embodiments as defined by the following claims.

What is claimed is:

1. An integrated circuit comprising:
on-chip interconnection logic;
a plurality of on-chip, functional units coupled to the interconnection logic, each on-chip functional unit to operate as a media processing stage at a respective, predetermined position within an on-chip media processing pipeline; and an on-chip controller to enable at least one selected off-chip functional unit to operate as a media processing stage at a selected location within the on-chip media processing pipeline to form a modified media processing pipeline, wherein said on-chip interconnection logic is configured to enable said at least one selected off-chip functional unit to perform the functionality of a disabled one of said on-chip, functional units within said modified media processing pipeline.

2. The integrated circuit of claim 1, wherein the interconnection logic comprises a crossbar.

3. The integrated circuit of claim 1, further comprising:

a memory controller coupled to the interconnection logic to communicate with an off-chip system memory to enable at least two of the on-chip functional units and the at least one off-chip functional unit to share a memory array provided by the system memory.

4. The integrated circuit of claim 1, further comprising:

a display controller coupled to the interconnection logic to receive media data processed according to the media processing pipeline; and a display driver to receive data from the display controller and to drive a display with the data.

5. The integrated circuit of claim 4, wherein the display controller comprises:

a graphics engine; and alpha blend logic coupled to the graphics engine.

6. The integrated circuit of claim 1, further comprising:

an on-chip video processor coupled to the interconnection logic;

a port coupled to the interconnection logic to communicate with an off-chip video processor; and alpha blend logic to receive video data from the on-chip video processor or alternate video data from the off chip video processor.

7. A method comprising:

selecting at least one off-chip functional unit to operate as a processing stage of an on-chip media processing pipeline that includes a plurality of on-chip functional units, each on-chip functional unit to operate as a media processing stage at a respective, predetermined position within the on-chip media processing pipeline;

configuring an interconnection device of the IC to connect a port of the IC to the on-chip media processing pipeline, the port also connected to an off-chip functional unit, the off chip functional unit to operate as a media processing stage at a selected position within the on-chip media processing pipeline to form a modified media processing pipeline;

selecting an on-chip functional unit of the on-chip media processing pipeline;

disabling the selected on-chip functional unit; and configuring the interconnection device to enable another off-chip functional unit to perform the functionality of the disabled function of the selected on-chip functional unit within the modified on-chip media processing pipeline.

8. The method of claim 7, further comprising:

configuring the interconnect device to source and sink media data between an external video processor and the modified media pipeline.

* * * * *